United States Patent
Alves et al.

(10) Patent No.: US 12,124,435 B1
(45) Date of Patent: Oct. 22, 2024

(54) AUTOMATED INTELLIGENT CORRECTION OF ERRONEOUS DATA IN A TRANSACTION DATASET

(71) Applicant: FMR LLC, Boston, MA (US)

(72) Inventors: Douglas Alves, Mesa, AZ (US); Christopher Parsons, Mansfield, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/599,444

(22) Filed: Mar. 8, 2024

(51) Int. Cl.
G06F 16/23 (2019.01)

(52) U.S. Cl.
CPC ...... *G06F 16/2379* (2019.01); *G06F 16/2365* (2019.01)

(58) Field of Classification Search
CPC .................. G06F 16/2379; G06F 16/2365
See application file for complete search history.

(56) References Cited

U.S. PATENT DOCUMENTS

| | | | |
|---|---|---|---|
| 11,080,120 | B2 | 8/2021 | Lee et al. |
| 11,711,258 | B2 | 7/2023 | Ledbetter et al. |
| 2023/0047437 | A1* | 2/2023 | Kolar ............... G06N 20/00 |
| 2023/0106852 | A1 | 4/2023 | Lee et al. |
| 2023/0109607 | A1 | 4/2023 | Lee et al. |
| 2023/0144396 | A1 | 5/2023 | Burnett et al. |
| 2023/0153826 | A1 | 5/2023 | Srivastava et al. |
| 2023/0237498 | A1 | 7/2023 | Srivastava et al. |

OTHER PUBLICATIONS

L.B.V. De Amorim et al., "The choice of scaling technique matters for classification performance," arXiv:2212.12343v1 [cs.LG], Dec. 23, 2022, available at arxiv.org/pdf/2212.12343.pdf, 37 pages.
N. Passalis et al., "Deep Adaptive Input Normalization for Time Series Forecasting," arXiv:1902.07892v2 [q-fin.CP], Sep. 22, 2019, available at arxiv.org/pdf/1902.07892.pdf, 7 pages.
J. Li et al., "Feature Selection: A Data Perspective," ACM Comput. Surv. vol. 9, No. 4, Article 39 (Mar. 2010), also available as arXiv:1601.07996v5 [cs.LG], Aug. 26, 2018, available at arxiv.org/pdf/1601.07996.pdf, 45 pages.

* cited by examiner

*Primary Examiner* — Robert W Beausoliel, Jr.
*Assistant Examiner* — Mohammad S Bhuyan
(74) *Attorney, Agent, or Firm* — Cesari and McKenna, LLP

(57) ABSTRACT

Automated intelligent correction of erroneous data for uninterrupted transaction processing includes a server that captures real-time transaction data from a transaction message stream. The server determines errors in the real-time transaction data for the transaction. The server identifies a trained artificial intelligence (AI) model from a plurality of trained AI models based upon the determined errors and executes the identified AI model using the real-time transaction data as input to correct the errors. The server determines a workflow state of the transaction using the real-time transaction data. The server generates a message for insertion in the transaction message stream, the message comprising the corrected real-time transaction data. The server inserts the generated message in the transaction message stream.

18 Claims, 8 Drawing Sheets

*Real-time Transaction Data*

| Order Started Timestamp | Order ID | Order Type | Symbol | Quantity | Price | Status | Order Status Timestamp |
|---|---|---|---|---|---|---|---|
| 2024-01-15 10:23:12 | A123BY | BUY | AAPL | 100 | $10 | FILLED | 2024-01-15 10:23:17 |
| 2024-01-15 10:24:01 | A412CN | SELL | BAC | 200 | $12 | FILLED | 2024-01-15 10:24:03 |
| 2024-01-15 10:25:49 | A927X3 | SELL | JPM | 100 | $11 | NOT FILLED | 2024-01-15 10:26:52 |
| 2024-01-15 10:27:19 | B477RE | BUY | C | 200 | $10 | FILLED | 2024-01-15 10:27:24 |

*Historical Transaction Data*

| Order Started Timestamp | Order ID | Order Type | Symbol | Quantity | Price | Status | Order Status Timestamp |
|---|---|---|---|---|---|---|---|
| 2023-08-12 13:22:21 | M4543X | BUY | AAPL | 50 | $8 | FILLED | 2023-08-12 13:22:30 |
| 2023-08-12 13:23:08 | M327YV | SELL | BAC | 12 | $15 | FILLED | 2023-08-12 13:23:11 |
| 2023-08-12 13:24:41 | MIZ65E | SELL | JPM | 75 | $13 | FILLED | 2023-08-12 13:24:44 |
| 2023-08-12 13:25:10 | MX653K | BUY | C | 400 | $7 | FILLED | 2023-08-12 13:25:15 |

*Transformed Transaction Data*

| ID | Order Started TimeDate | Order ID | Order Type | Symbol | Quantity | Price | Status | Order Status TimeDate |
|---|---|---|---|---|---|---|---|---|
| 0001 | 1 | M4543X | 1 | AAPL | 50 | $8 | 1 | 12312434 |
| 0002 | 2 | M327YV | 2 | BAC | 12 | $15 | 1 | 98483843 |
| 0003 | 3 | M1Z65E | 2 | JPM | 75 | $13 | 1 | 98324756 |
| 0004 | 4 | MX653K | 1 | C | 400 | $7 | 1 | 12658438 |
| ... | ... | ... | ... | ... | ... | ... | ... | ... |
| 0124 | 27 | A123BY | 1 | AAPL | 100 | $10 | 1 | 89234756 |
| 0125 | 28 | A412CN | 2 | BAC | 200 | $12 | 1 | 23423563 |
| 0126 | 29 | A927X3 | 2 | JPM | 100 | $11 | 2 | 62378234 |
| 0127 | 30 | B477RE | 1 | C | 200 | $10 | 1 | 17234634 |
| ... | | | | | | | | |

FIG. 6

AUTOMATED INTELLIGENT CORRECTION OF ERRONEOUS DATA IN A TRANSACTION DATASET

TECHNICAL FIELD

This application relates generally to methods and apparatuses, including computer program products, for automated intelligent correction of erroneous data in a transaction dataset for uninterrupted transaction processing.

BACKGROUND

Modern high-throughput transaction computing systems (like securities trading platforms) are typically built to minimize latency and maximize transaction throughput. These computing systems leverage advanced computing systems such as cloud-based environments to achieve the scalability and processing power to deliver on the transaction processing requirements. As a result, the uninterrupted execution of transactions and elimination of data errors that can lead to transaction failure is critical. Increasing volatility with dynamically changing transaction behaviors reinforce the criticality of these systems, which must be available to handle significant transaction workloads at all hours.

SUMMARY

Therefore, what is needed are methods and systems to enable automated intelligent correction of erroneous data in a transaction dataset for uninterrupted transaction processing. The systems and methods described herein advantageously leverage a self-healing, event-driven framework for detecting and remediating errors in transaction data for a high-volume, high-throughput transaction platform. The framework utilizes advanced artificial intelligence (AI) modeling algorithms to predict corrections to data errors in transactions and deploy the corrections to the appropriate location in the transaction pipeline for an uninterrupted flow.

The techniques described herein provide a number of technical advancements over existing transaction processing systems. For example, the technology significantly reduces transaction failure and prevents critical production issues, as the systems and methods detect and resolve transaction discrepancies before they result in more serious problems—such as transaction reversal or asset loss. In addition, the methods and systems provide a reduced need for manual intervention and troubleshooting of problematic transactions. Instead of a systems analyst spending hours or days trying to figure out or replicate an issue, the techniques described herein enable the automatic diagnosis and resolution of the issue in a matter of seconds. Finally, efficiency and productivity of the company operations teams is significantly improved, as the team can focus on more strategic initiatives and higher-value deliverables instead of wasting resources and time on fixing transaction issues.

The invention, in one aspect, features a computerized method of automated intelligent correction of erroneous data in a transaction dataset for uninterrupted transaction processing. A server computing device captures real-time transaction data from a transaction message stream connecting a plurality of microservices in a transaction processing system. The real-time transaction data comprises a message that is exchanged between two of the microservices in the transaction processing system during execution of a transaction. The server computing device determines one or more errors in the real-time transaction data for the transaction. The server computing device identifies a trained artificial intelligence (AI) model from a plurality of trained AI models based upon the determined errors. The server computing device executes the identified AI model using the real-time transaction data as input to correct the one or more errors in the real-time transaction data for the transaction. The server computing device determines a workflow state of the transaction using the real-time transaction data, the workflow state including an identity of the microservice that originated the message. The server computing device generates a message for insertion in the transaction message stream, the message comprising the corrected real-time transaction data. The server computing device inserts the generated message in the transaction message stream, where the insertion location is after the microservice that originated the message as identified in the workflow state and where the message is processed by one or more other microservices in the transaction processing system to complete execution of the transaction.

The invention, in another aspect, features a system for automated intelligent correction of erroneous data in a transaction dataset for uninterrupted transaction processing. The system comprises a server computing device having a memory for storing computer-executable instructions and a processor that executes the computer-executable instructions. The server computing device captures real-time transaction data from a transaction message stream connecting a plurality of microservices in a transaction processing system. The real-time transaction data comprises a message that is exchanged between two of the microservices in the transaction processing system during execution of a transaction. The server computing device determines one or more errors in the real-time transaction data for the transaction. The server computing device identifies a trained artificial intelligence (AI) model from a plurality of trained AI models based upon the determined errors. The server computing device executes the identified AI model using the real-time transaction data as input to correct the one or more errors in the real-time transaction data for the transaction. The server computing device determines a workflow state of the transaction using the real-time transaction data, the workflow state including an identity of the microservice that originated the message. The server computing device generates a message for insertion in the transaction message stream, the message comprising the corrected real-time transaction data. The server computing device inserts the generated message in the transaction message stream, where the insertion location is after the microservice that originated the message as identified in the workflow state and where the message is processed by one or more other microservices in the transaction processing system to complete execution of the transaction.

Any of the above aspects can include one or more of the following features. In some embodiments, the plurality of microservices comprise a transaction pipeline and each microservice performs a different function for execution of the transaction. In some embodiments, the one or more errors comprise missing values for data elements, incorrect values for data elements, or invalid values for data elements. In some embodiments, identifying a trained AI model comprises determining one or more characteristics of the errors in the real-time transaction data, and selecting one of the trained AI models based upon the determined characteristics. In some embodiments, the identified AI model corrects the errors in the real-time transaction data by imputing a predicted replacement value for a data element in the real-time transaction data that has a missing value. In some embodiments, the identified AI model corrects the errors in the real-time transaction data by replacing an incorrect value for a data element in the real-time transaction data with a predicted correct value.

In some embodiments, the server computing device trains one or more of the plurality of AI models using the real-time transaction data and historical transaction data. In some embodiments, training one or more of the plurality of AI models using the real-time transaction data and historical transaction data comprises combining at least a portion of the real-time transaction data and at least a portion of the historical transaction data into a training dataset, transforming one or more data elements in the training dataset into a format compatible for ingestion by the AI model being trained, and executing the AI model being trained using the training dataset to create a re-trained version of the AI model being trained.

In some embodiments, executing the identified AI model using the real-time transaction data as input comprises invoking an instance of the identified AI model using an application programming interface (API) for the identified AI model, passing the real-time transaction data to the instance of the identified AI model using the API, and receiving output from the instance of the identified AI model that comprises the corrected real-time transaction data.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of exemplary real-time transaction data.

FIG. 5 is a diagram of exemplary historical transaction data.

FIG. 6 is a diagram of exemplary transformed transaction data.

DETAILED DESCRIPTION

Figure 1:
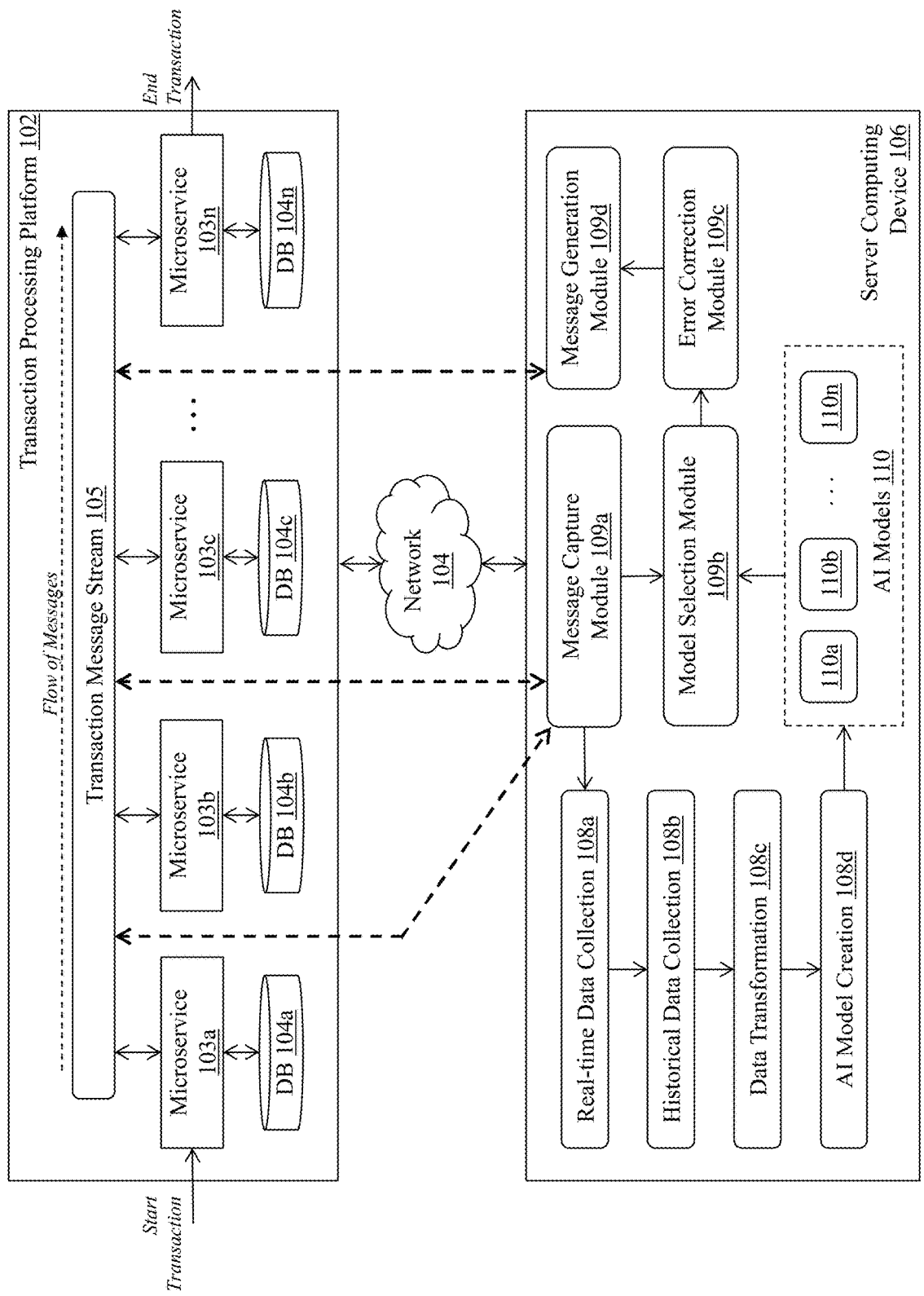
FIG. 1 is a block diagram of a system for automated intelligent correction of erroneous data in a transaction dataset for uninterrupted transaction processing.

FIG. 1 is a block diagram of system 100 for automated intelligent correction of erroneous data in a transaction dataset for uninterrupted transaction processing. System 100 includes transaction processing platform 102 that comprises a plurality of microservices 103a-103n, each coupled to a correspondence database 104a-104n, and transaction message stream 105 that enables the transfer of messages between microservices for the purpose of transaction execution. System 100 further includes communication network 104 and server computing device 106. Server computing device 106 includes real-time data collection function 108a, historical data collection function 108b, data transformation function 108c, artificial intelligence (AI) model creation function 108d, message capture module 109a, model selection module 109b, error correction module 109c, message generation module 109d, and a plurality of AI models 110a-110n.

Transaction processing platform 102 comprises one or more computing devices (which can be physical devices such as servers; logical devices such as containers, virtual machines, or other cloud computing resources; and/or a combination of both) which execute high-speed, high-throughput transactions (such as trades of financial instruments) based upon execution signals received from, e.g., one or more remote computing devices (not shown). For example, the remote computing devices can issue a transaction signal (e.g., instructions to execute a trade) along with a trade price, trade quantity, and/or other data such as user identifier, account identifier, etc., to transaction processing platform 102. A first microservice (e.g., microservice 103a) in transaction processing platform 102 receives the incoming transaction signal and performs one or more functions or steps (e.g., data validation, buy transactions, sell transactions, asset transfer transactions, and the like) as part of the trade processing workflow in order to carry out the trade identified in the transaction signal. Typically, microservices 103a-103n are arranged sequentially in a pipeline so that after each microservice 103a-103n completes its functions, the microservice transmits a message to the next microservice in the pipeline to perform the next function in the overall transaction workflow. In some embodiments, the message comprises one or more data elements that can be used by the next microservice in the pipeline to execute the necessary transaction processing functions. An exemplary transaction processing platform 102 includes, but is not limited to, an order management system of a brokerage trading platform or an institutional trading system.

Each microservice 103a-103n is coupled to a corresponding database 104a-104n, which is used by the related microservice to store data needed to perform the transaction processing function(s) for that microservice. In some embodiments, databases 104a-104n are configured using physical memory (e.g., disk storage, solid state memory), logical memory (e.g., object storage, block storage, and/or database instances in a cloud computing environment), or a combination of both.

Microservices 103a-103n connect to transaction message stream 105, which enables microservices 103a-103n to exchange messages relating to the transaction pipeline for the purpose of completing execution of the corresponding transactions. In some embodiments, transaction message stream 105 is configured as an event streaming platform-such as Apache Kafka® available from Apache Software Foundation. Generally, microservices 103a-103n act as 'producers' and 'consumers' with respect to transaction message stream 105. As a producer, a microservice publish events corresponding to transaction processing functions to transaction message stream 105, which transfers the message to the next microservice in the pipeline. As a consumer, a microservice subscribes to certain events being made available in transaction message stream 105 and when the microservice detects the subscribed events in stream 105, the microservice receives and processes the subscribed events. In some embodiments, each microservice 103a-103n is configured to send and receive messages designated according to one or more message topics. Generally, topics are used to organize and store messages; for example, messages can be sent by producers to a given topic and transaction message stream 105 appends the messages one after another to create a log file. Consumers can pull messages from a specific topic for processing. In some embodiments, each message comprises a key, a value, a compression type, a timestamp, a partition number and offset ID, and one or more optional metadata headers. Generally, the key can be a string, a number, or any object, and the value represents the content of the message. The partition number and offset ID are assigned when the message is sent to a topic. The combination of topic, partition number, and offset ID serves as a unique identifier for the message. It should be appreciated that transaction processing platform 102 can include any number of microservices 103a-103n.

As shown in FIG. 1, the flow of messages in transaction processing platform 102 can be directed in a 'downstream' fashion from microservice 103a as the start, through each of the microservices 103b and 103c, until reaching microservice 103n which is the end of the transaction pipeline. In some embodiments, messages can flow 'upstream' (e.g., from microservice 103b to 103a) as necessary. It should be appreciated that other mechanisms and arrangements for message flow in transaction processing platform 102 are within the scope of technology described herein.

Upon completion of a trade or other transaction(s) through the microservices 103a-103n pipeline, transaction processing platform 102 can transmit a message to one or more external computing resources that includes details of the trade for initiation of post-trade processing and reconciliation. It should be appreciated that transaction processing platform 102 is not limited to financial instrument trading and can correspond to any number of computing transaction processing and/or event processing systems where sequentially-arranged transaction execution functions (including error detection, post-transaction processing and/or reconciliation) may be required.

Transaction processing platform 102 is coupled to server computing device 106 via communication network 104. In some embodiments, network 104 comprises a local area network or a wide area network, or a combination of both. Exemplary networks 104 include but are not limited to an intranet, the Internet, and/or a cellular network. As can be appreciated, the communication network can be comprised of several discrete networks and/or sub-networks.

Server computing device 106 is a combination of hardware, including one or more special-purpose processors and one or more physical memory modules, and specialized software—such as functions 108a-108d, modules 109a-109d, and AI models 110—that are executed by processor(s) of server computing device 106 to receive data from other components of system 100, transmit data to other components of system 100, and perform functions for automated intelligent correction of erroneous data in a transaction dataset for uninterrupted transaction processing as described herein. In some embodiments, computing resources of server computing device 106 can be arranged in a cloud computing infrastructure, such that the resources are distributed into a plurality of regions defined according to certain geographic and/or technical performance requirements. Each region can comprise one or more datacenters connected via a regional network that meets specific low-latency requirements. Inside each region, the resources of server computing device 106 can be partitioned or replicated into one or more availability zones (AZs), which are physically separate locations used to achieve tolerance to, e.g., hardware failures, software failures, disruption in connectivity, unexpected events/disasters, and the like. Typically, the availability zones are connected using a high-performance network (e.g., round trip latency of less than two milliseconds). It should be appreciated that other types of computing resource distribution and configuration can be used within the scope of the technology described herein.

As noted above, server computing device 106 comprises real-time data collection function 108a, historical data collection function 108b, data transformation function 108c, artificial intelligence (AI) model creation function 108d, message capture module 109a, model selection module 109b, error correction module 109c, message generation module 109d, and a plurality of AI models 110a-110n. In some embodiments, one or more of these computing elements can comprise virtual computing resources, e.g., software modules such as a container that includes a plurality of files and configuration information (i.e., software code, environment variables, libraries, other dependencies, and the like) and one or more database instances (i.e., data files and/or a local database). In one embodiment, server computing device 106 is deployed using a commercially-available cloud computing platform. Exemplary cloud computing platforms include, but are not limited to: Amazon Web Services™ (AWS), Microsoft Azure™, and IBM Watson Cloud™, among others.

In some embodiments, functions 108a-108d, modules 109a-109d, and models 110a-110n are specialized sets of computer software instructions programmed onto one or more dedicated processors of server computing device 106, and can include specifically-designated memory locations and/or registers for executing the specialized computer software instructions. It should be appreciated that any number of computing devices, arranged in a variety of architectures, resources, and configurations (e.g., cluster computing, virtual computing, cloud computing) can be used without departing from the scope of the invention. Exemplary functionality of functions 108a-108d, modules 109a-109d, and models 110a-110n is described in detail throughout this specification.

Figure 2:
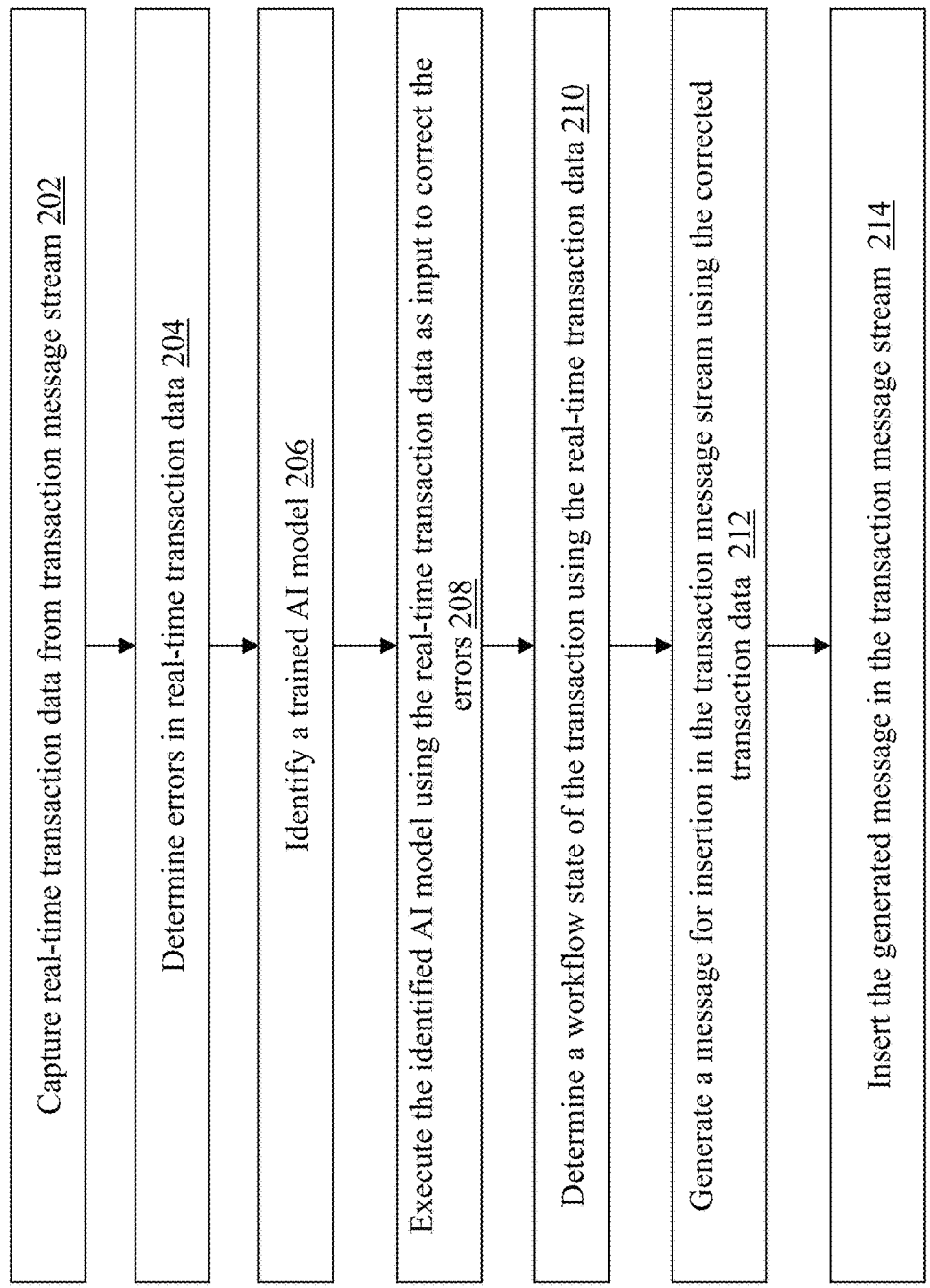
FIG. 2 is a flow diagram of a method of automated intelligent correction of erroneous data in a transaction dataset for uninterrupted transaction processing.

FIG. 2 is a flow diagram of a computerized method 200 of automated intelligent correction of erroneous data in a transaction dataset for uninterrupted transaction processing, using system 100 of FIG. 1. During operation of system 100, transaction processing platform 102 receives transaction signal(s) from one or more external computing systems at microservice 103a. For example, microservice 103a can receive a transaction signal from a remote computing device (such as a client computing device of a financial services agent) corresponding to a sell order for 100 shares of XYZ stock for a specific customer. The transaction signal can comprise a plurality of data elements that indicate the transaction details (e.g., number of shares, buy/sell price, ticker symbol, customer ID, order ID) as well as certain metadata relating to the transaction (e.g., order submission timestamp). In some embodiments, the transaction signal is received by microservice 103a in a structured format (e.g., XML, JSON).

Upon receiving the transaction signal, microservice 103a can perform one or more functions to initiate execution and processing of the transaction. For example, microservice 103a can be configured to analyze the format, structure, and/or data of the incoming transaction signal to validate that the signal is correctly formed, the signal is coming from an authorized sender, the signal does not have any errors or corrupted data, etc. Upon completing its transaction functions, microservice 103*a* can then generate a message (i.e., a Kafka™ message) comprising information relating to the transaction and transmit the message to a topic in transaction message stream 105. One or more microservices 103*b*-103*n* that are subscribed to the topic consume the message from transaction message stream 105 and perform subsequent transaction processing functions (for example, price validation, ticker symbol validation, etc.) to continue the transaction workflow. Upon completing their processing functions, the microservices 103*b*-103*n* can generate a further message for production to a topic in transaction message stream 105 and downstream consumption by additional microservice(s). In the example shown in FIG. 1, microservice 103*b* consumes messages that are produced by microservice 103*a*, microservice 103*c* consumes messages that are produced by microservice 103*b*, and microservice 103*n* consumes messages that are produced by microservice 103*c*—although other configurations and message flows can be used within the scope of the technology described herein.

During real-time transaction processing conducted by microservices 103*a*-103*n*, message capture module 109*a* of server computing device 106 listens to messages on transaction message stream 105 and captures (step 202) real-time transaction data from the stream 105, i.e., the messages being exchanged between the microservices 103*a*-103*n*. In some embodiments, module 109*a* is configured as a consumer in the event streaming platform and subscribes to receive messages associated with certain topics in stream 105. In some embodiments, message capture module 109*a* can receive messages from transaction message stream 105 that are transmitted between each microservice 103*a*-103*n* in the pipeline, as well as transmit messages to stream 105 for consumption by microservices 103*a*-103*n* (as indicated by the dashed-line arrows in FIG. 1).

As can be appreciated, in some instances a transaction may not be processed correctly or completely by transaction processing platform 102 due to errors with the transaction data and/or technical issues in platform 102. For example, a transaction signal may be received by microservice 103*a* that is missing data and/or contains incorrect or invalid data for one or more fields (e.g., ticker symbol, price, quantity) that are required for successful processing of the transaction. In another example, transaction processing platform 102 may be required to process and confirm certain types of transactions (e.g., equity trades) within a defined latency threshold (e.g., less than 100 ms). One or more of the microservices 103*a*-103*n* may be configured to determine, based upon timestamp(s) associated with the transaction messages, that the trade will not be executed and confirmed within the defined latency threshold-which results in a trading error. In another example, hardware and/or software computing resources in transaction processing platform 102 may experience connectivity issues, bottlenecking, service interruptions, or other technical challenges that impact the performance of platform 102 in successfully processing transactions. In any of these or other scenarios, message capture module 109*a* is configured to listen for messages that indicate actual or potential errors and utilize advanced AI data processing techniques to mitigate such errors and ensure uninterrupted processing of transactions.

Generally, the data analysis and message generation functions of elements 108*a*-108*d*, 109*a*-109*d* and 110 of server computing device 106 are partitioned into two functional groups: 1) transaction data collection and transformation for training and deployment of AI error detection models, and 2) execution of trained AI error detection models to automatically correct transaction data and generate messages for consumption by microservices 103*a*-103*n* in transaction processing platform 102. In some embodiments, elements 108*a*-108*d* perform the processing for functional group #1 which trains and deploys AI models 110*a*-110*n*, and elements 109*a*-109*d* perform the processing for functional group #2 which executes AI models 110*a*-110*n* for correction of transaction data. Additional details about the operation and functionality of each of these functional groups are provided below.

Figure 3:
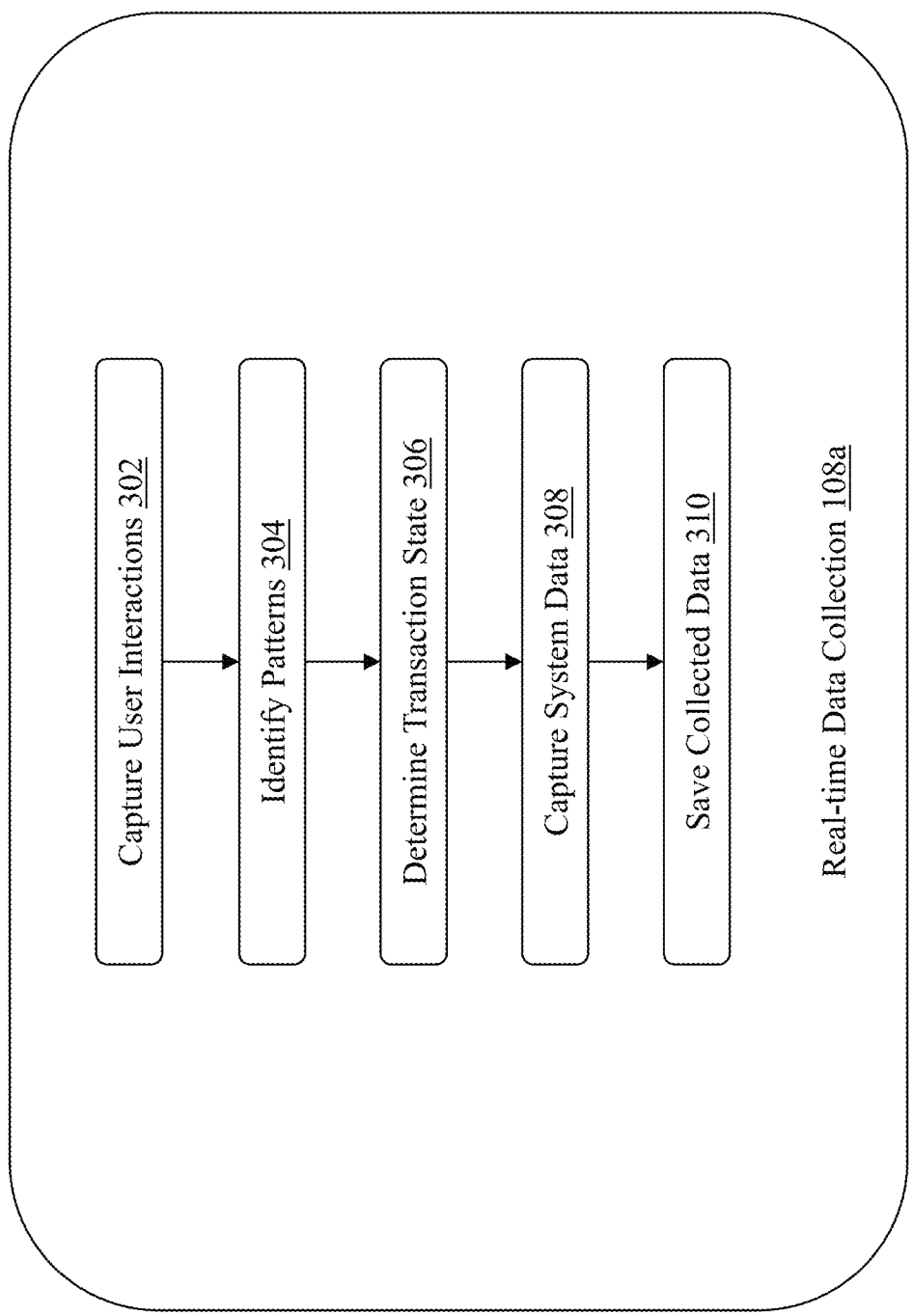
FIG. 3 is a detailed block diagram of a real-time data collection function.

During normal operation of transaction processing platform 102, message capture module 109*a* receives transaction messages from stream 105 and transmits the messages to real-time data collection function 108*a*, which aggregates and organizes the real-time transaction data in a structured format for ingestion by data transformation module 108*c*. FIG. 3 is a detailed block diagram 300 of real-time data collection function 108*a*. Function 108*a* includes the following subfunctions: capturing user interactions 302, identifying patterns 304, determining transaction state 306 (i.e., error or normal), capturing system data 308 and saving collected data 310. In some embodiments, when real-time transaction data is received from message capture module 109*a*, capturing user interactions 302 subfunction collates the real-time transaction data into one or more user interactions (e.g., a transaction or transactions associated with a specific user). Identifying patterns subfunction 302 analyzes the user interaction data for one or more users to identify one or more patterns in the transaction data. For example, subfunction 304 can analyze specific data elements (e.g., transaction types, order amounts, timestamps, data formats/values, etc.) to identify recurrences, similarities, or other patterns in the transaction data. Determining transaction state subfunction 306 associates the identified patterns with a corresponding transaction state—in some instances, a particular transaction pattern may always be associated with an error state (meaning, e.g., that the transaction failed to complete successfully). Capturing system data subfunction 308 collects data and/or metadata associated with the user interaction that is maintained by platform 102, such as internal transaction identifiers, status indicators, microservice workflow state, and so forth. Saving collected data subfunction 310 stores the captured interaction data in, e.g., local memory (which can be transient or persistent). FIG. 4 is a diagram of exemplary real-time transaction data collected by function 108*a*. The transaction data includes data elements associated with a plurality of transactions being processed by platform 102—such as order started timestamp, order ID, order type (e.g., BUY/SELL), ticker symbol, quantity, price, status (e.g., FILLED/NOT FILLED), and order status timestamp. As shown, one of the transactions did not complete successfully—as reflected by the status of NOT FILLED-because the ticker symbol 402 'JP.M' is invalid and should have been 'JPM.'

Concurrently with the collection of real-time transaction data by function 108*a*, historical data collection function 108*b* retrieves transaction data for prior transactions executed by platform 102. The historical transaction data is stored in one or more databases or data storage platforms (not shown) and function 108*b* retrieves the historical transaction data for a defined timeframe (e.g., prior 30 days, prior 60 days, etc.). FIG. 5 is a diagram of exemplary historical transaction data collected by function 108*b*. In some embodiments, function 108*b* retrieves historical transaction data only for transactions that completed successfully (i.e., have a status of FILLED). As shown in FIG. 5, one of the transactions comprises a sell order for JPM stock; here, the ticker symbol 502 is correct and thus the trade was processed successfully.

The real-time transaction data and the historical transaction data are fed into data transformation function 108c, which performs data conversion and other feature transformation/feature engineering processing on the transaction data to generate a feature set for ingestion by AI model creation function 108d. FIG. 6 is a diagram of exemplary transformed transaction data generated by function 108c. As shown in FIG. 6, certain data elements have been converted into different values (e.g., order type has been converted from a string into a numeric value), additional values (e.g., ID) have been added, and so forth. The result is a feature dataset that can be used as a training dataset for creation and training of AI models 110 that are configured to analyze newly-received real-time transaction data that may contain errors to cause a transaction to fail, and generate predictions of how to correct the erroneous data so the transaction can be remediated either in real-time to provide uninterrupted processing of the transaction and/or be reprocessed by transaction processing platform 102 to result in a successful transaction. It should be appreciated that other methodologies for generating a training dataset and/or performing feature engineering for AI models can be used within the scope of the technology described herein.

Once the training dataset is created, AI creation function 108d generates and trains one or more AI models 110 to predict corrections to erroneous transaction data using the training dataset. Generally, AI models 110 comprise machine learning algorithms and/or frameworks comprising classification models, neural networks, generative pre-trained transformers, and/or other ML computing structures, platforms, frameworks, or algorithms that receive the training dataset as input and analyze the training data to, e.g., learn patterns, recognize variations, and make decisions with respect to the training data and then apply the learned analysis to previously unseen data (such as real-time transaction data received from platform 102). Typically, AI models 110 are based upon programmatic code that, when executed, processes the input training dataset and/or the real-time transaction dataset to perform a variety of different actions (e.g., model training and re-training, data analysis, prediction, etc.). Exemplary machine learning frameworks and algorithms can include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), generative pre-trained transformers (e.g., GPT-4), supervised or unsupervised algorithms, and others. In some embodiments, each AI model 110a-110n is constructed using a different machine learning algorithm or framework and/or each AI model 110a-110n is configured to make different type(s) of predictions using the input data. As can be appreciated, the patterns occurring in the real-time transaction data may change over time—for example, new errors in the data may occur that were previously not captured in the historical transaction data. In some embodiments, functions 108a-108d can periodically or continuously perform their respective functions on incoming real-time transaction data to re-train AI models 110 for improved accuracy and robustness in detecting changing patterns and variations.

Figure 7:
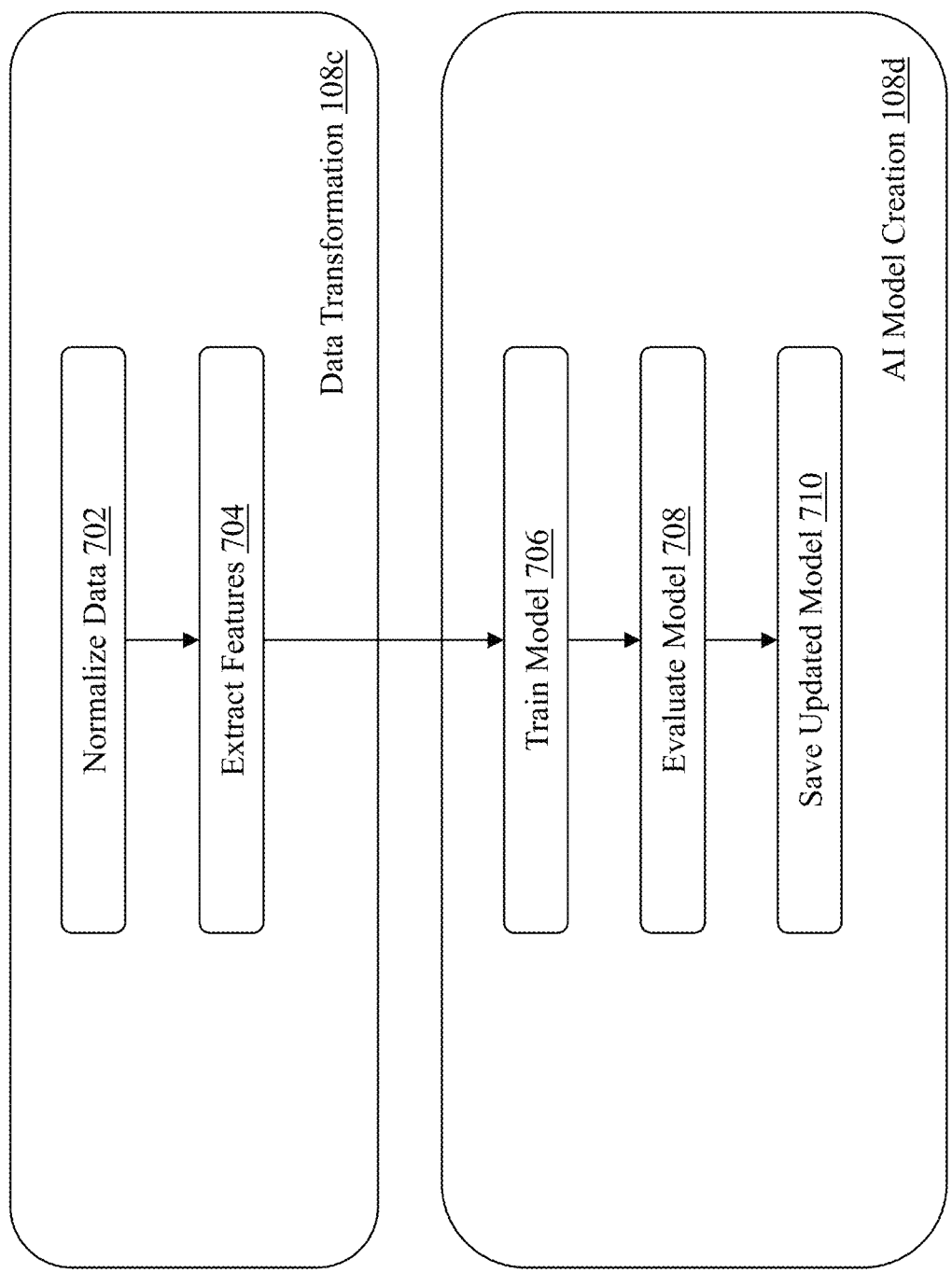
FIG. 7 is a detailed block diagram of a data transformation function and an AI model creation function.

FIG. 7 is a detailed block diagram of data transformation function 108c and AI model creation function 108d. As described above, data transformation function 108c performs data conversion and other feature transformation/feature engineering processing on the transaction data to generate a feature set for ingestion by AI model creation function 108d. Normalizing data subfunction 702 ingests the transaction data and cleans the data using one or more normalization functions—such as min-max scaling and/or z-score normalization, as described in (i) L. de Amorim et al., "The choice of scaling technique matters for classification performance," arXiv:2212.12343v1 [cs.LG] 23 Dec. 2022, available at arxiv.org/pdf/2212.12343.pdf, and (ii) N. Passalis et al, "Deep Adaptive Input Normalization for Time Series Forecasting," arXiv: 1902.07892v2 [q-fin.CP] 22 Sep. 2019, available at arxiv.org/pdf/1902.07892.pdf, each of which is incorporated herein by reference.

Next, extracting features subfunction 704 generates a training feature set using the normalized transaction data. In some embodiments, subfunction 704 performs a dimensionality reduction on the normalized data to generate the training feature data set-including feature extraction and feature selection processes. Generally, feature extraction comprises the step of projecting original high-dimensional feature data into a low-dimensional feature space and feature selection comprises the step of selecting a subset of the original features for generating AI models. Additional information regarding exemplary feature set generation algorithms is described in J. Li et al., "Feature Selection: A Data Perspective," ACM Comput. Surv. 9, 4, Article 39 (March 2010), arXiv:1601.07996 [cs.LG] 26 Aug. 2018, available at arxiv.org/pdf/1601.07996.pdf, which is incorporated herein by reference.

The training feature set is provided to AI model creation function 108d for training and testing of one or more AI models 110a-110n. As described above, training model subfunction 706 uses the training data set as input to a machine learning (ML) algorithm/framework to generate a corresponding AI model 110a-110n based on the selected ML algorithm. Evaluating model subfunction 708 executes the trained model using a test data set to validate performance of the model based upon one or more criteria (e.g., accuracy, precision, recall, F1 score, area under receiver operating characteristics curve (AU-ROC), mean square error (MSE), etc.). Typically, the test data set is based upon historical transaction data for which a corresponding outcome (success, failure) is known and the output of the model execution on the test data is compared to the known outcome (also called ground truth) in order to evaluate the performance of the model. In some embodiments, depending upon the result of the model evaluation, AI model creation module 108d can retrain one or more of the AI models 110a-110n to improve the performance metrics. Once the trained AI models 110a-110n are evaluated, saving updated model subfunction 710 stores the updated models 110a-110n, e.g., in local memory and/or in a connected database.

After the AI models 110 are created and trained, server computing device 106 can deploy the AI models 110 on real-time transaction data that is flowing through microservices 103a-103n of transaction processing platform 102 to perform automated intelligent correction of erroneous data as described herein. Turning back to FIG. 2, message capture module 109a captures (step 202) real-time transaction data from transaction message stream of platform 102 as described above. Message capture module 109a determines (step 204) that one or more errors exist in the real-time transaction data for the transaction. Module 109a can determine one or more errors based upon the messages consumed from transaction processing stream 105. For example, microservice 103b receives a buy order for 100 shares of ticker 'JP.M' from microservice 103a and attempts to transfer the requested shares between brokerage accounts as part of the overall transaction. Because the ticker symbol is incorrect, microservice 103b is unable to perform the transfer function and generates a message to stream 105 that flags the order as NOT FILLED. Message capture module 109a captures the message generated by microservice 103b (e.g., by listening for messages produced by microservice 103b) and determines that the message corresponds to an order with possibly erroneous data. Module 109a transmits the transaction details to model selection module 109b for processing.

Model selection module 109b identifies (step 206) one of the trained AI models 110a-110n to be used in correcting the erroneous data in the transaction message based upon the determined error(s). For example, in a situation where the incoming real-time transaction data is missing one or more data values, model selection module 109b can identify a particular trained AI model 110a (e.g., an imputation model) for use in correcting the error. In another example, where the incoming transaction data contains values for all of the data elements, but the transaction still failed, model selection module 109b can identify a different trained AI model 110b (e.g., a classification model) for use in correcting the error. In some embodiments, one or more of the AI models 110 are made available locally by server computing device 106 (as shown in FIG. 1). Model selection module 109b can configure an instance of the identified AI model 110, e.g., in local memory. In other embodiments, one or more of the AI models 110 are hosted by an external service and model selection module 109b uses an application programming interface (API) to connect to the external service and invoke an instance of the identified AI model. When the model instance is set up, module 109b passes the real-time transaction data to the model instance for processing and module 109b receives corresponding output from the model instance when processing is complete. In some embodiments, model selection module 109b can transform the incoming real-time transaction data (e.g., using data transformation function 108c as described above) to prepare the transaction data for ingestion by the identified AI model. Model selection module 109b provides the identified AI model and the real-time transaction data to error correction module 109c.

Error correction module 109c executes (step 208) the identified AI model 110a-110n using the real-time transaction data as input to correct one or more errors in the real-time transaction data. As mentioned above, the identified AI model 110a-110n can be configured to impute missing values in the transaction data and/or correct invalid or incorrect data values in the transaction data. In some embodiments, the identified AI model 110a-110n is configured to impute missing data by, e.g., identifying characteristics of the input data's missing value distribution-including a) evaluating missing value percentages (i.e., what percentage of the values for a feature are missing), b) identifying if the feature is normally distributed, c) recognizing if data is missing at complete random (MCAR), d) discerning if the feature(s) with missing values should be treated as numeric (e.g., measurements) or categorical (i.e., data type that can be identified via names or labels), and e) deciding if the dataset is a classification or regression problem. Additionally, for time series data, model 110a-110n can evaluate f) whether the missing data for a feature has a long distance gap—e.g., for a missing value at time step t, if the difference between the value at time step t-n (the last time step before t with a non-missing value) and the value at time step t+m (the first time step after t with a non-missing value) is greater than a certain threshold, then module 106a flags the missing value as a long distance missing value. In some embodiments, the identified AI model 110a-110n is configured to generate an accuracy prediction score for one or more data values in the real-time transaction data as correct or incorrect, and then identify a replacement value for the data values based upon the accuracy prediction score. Using the example above, the identified AI model 110a-110n can analyze the transaction data to generate an accuracy prediction score of 0.08 for ticker symbol 'JP.M'-which indicates that AI model 110a-110n is confident that the ticker symbol 'JP.M' is not correct. Then, based upon its learned knowledge of transaction data patterns from the training phase, model 110a-110n can determine that the correct ticker symbol should be 'JPM.' Error correction module 109c uses the output from AI model 110a-110n to modify the erroneous value(s) in the real-time transaction data. As can be appreciated, in some embodiments model selection module 109b and error correction module 109c can identify and execute a plurality of AI models 110a-110n to correct different types of erroneous transaction data for a single set of real-time transaction data for a given transaction. Error correction module 109c transmits the real-time transaction data and the corrected data output from AI model 110a-110n to message generation module 109d.

Message generation module 109d uses the received transaction data and corrected data to generate one or more transaction messages for transmission to transaction message stream 105 of platform 102 and subsequent consumption by one or more of the microservices 103a-103n. In order to determine which microservice should consume the generated message(s), message generation module 109d determines (step 210) a workflow state of the transaction using the real-time transaction data. In some embodiments, each transaction message generated by microservices 103a-103n includes a metadata header that indicates a current state of the transaction in the overall transaction pipeline of platform 102. For example, one stage of the pipeline can be data verification performed by microservice 103a. After completing the data verification processing, microservice 103a generates a transaction message for production to a particular topic in stream 105. Microservice 103a can write a particular metadata header (e.g., key-value pair) that contains indicia of the current state of the transaction and/or the identity of microservice 103a as the originator of the message. Using this information, message generation module 109d is able to identify a particular topic to which the message should be produced and/or which microservice 103b-103d should consume the message.

Figure 8:
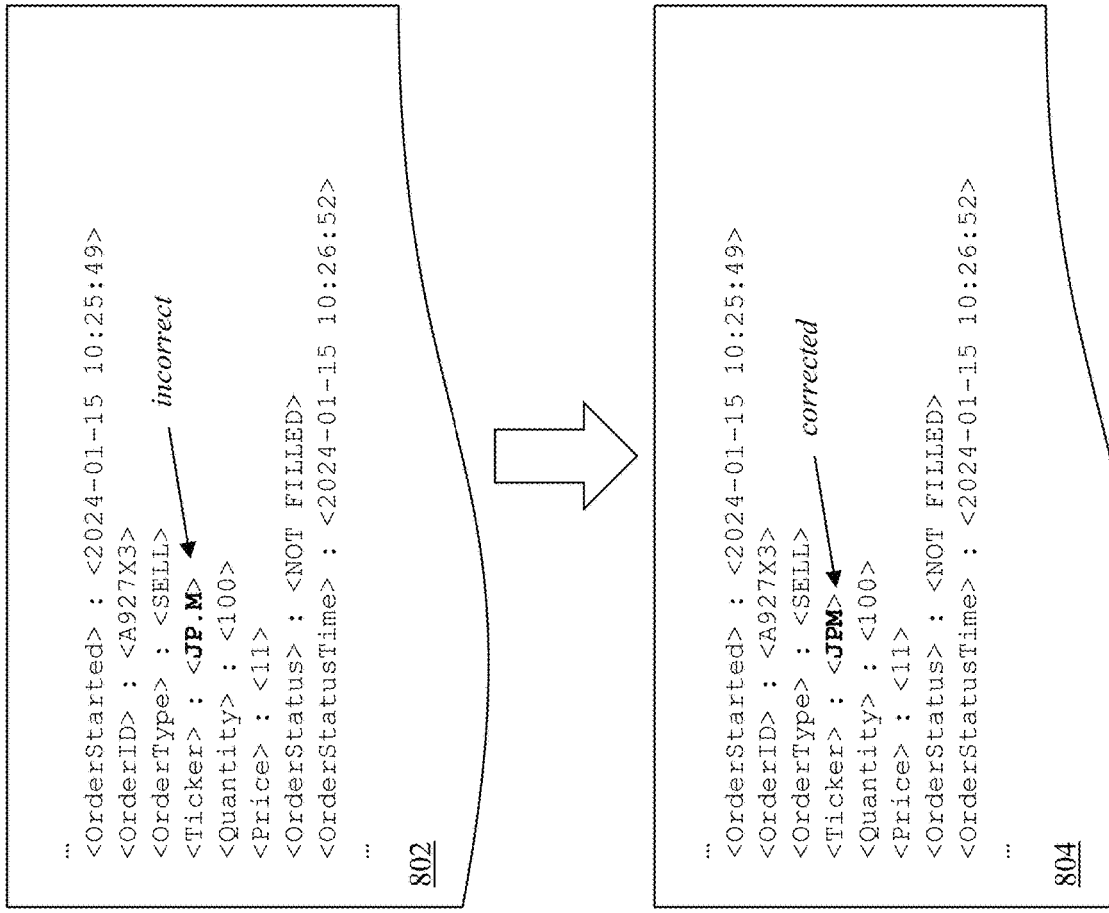
FIG. 8 is a diagram of a first transaction message with erroneous transaction data and a second transaction message with corrected transaction data.

Message generation module 109d generates (step 212) a message for insertion in the transaction message stream, where the newly-generated message comprises the corrected real-time transaction data. In some embodiments, the message includes one or more metadata headers that comprise the workflow state and/or message routing details as determined in step 210 above. FIG. 8 is a diagram of a transaction message 802 with erroneous transaction data as received by message capture module 109a and a transaction message 804 generated by message generation module 109d with corrected transaction data resulting from execution of AI model 110a-110n. As shown in FIG. 8, transaction message 802 comprises the real-time transaction data received from microservice 103a-including the incorrect ticker symbol 'JP.M'. Transaction message 804 comprises real-time transaction data with the corrected ticker symbol 'JPM' as determined by error correction module 109c and AI model 110a-110n.

Based upon the workflow state/message routing in the newly-generated message 804, message generation module 109d inserts (step 214) the message 804 in the transaction processing stream 105 of platform 102. As described above, module 109d can produce the message 804 to a defined topic in stream 105 so that the next microservice 103a-103n in the pipeline will consume the message and continue with the transaction processing workflow until successful completion of the transaction is achieved.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application, and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting the subject matter described herein.

What is claimed is:

1. A computerized method of automated intelligent correction of erroneous data in a transaction dataset for uninterrupted transaction processing, the method comprising:
    capturing, by a server computing device, real-time transaction data from a transaction message stream connecting a plurality of microservices in a transaction processing system, the real-time transaction data comprising a message that is exchanged between two of the microservices in the transaction processing system during execution of a transaction;
    determining, by the server computing device, one or more errors in the real-time transaction data for the transaction;
    identifying, by the server computing device, a trained artificial intelligence (AI) model from a plurality of trained AI models based upon the determined errors;
    executing, by the server computing device, the identified AI model using the real-time transaction data as input to correct the one or more errors in the real-time transaction data for the transaction;
    determining, by the server computing device, a workflow state of the transaction using the real-time transaction data, the workflow state including an identity of the microservice that originated the message;
    generating, by the server computing device, a message for insertion in the transaction message stream, the message comprising the corrected real-time transaction data;
    inserting, by the server computing device, the generated message in the transaction message stream, wherein the insertion location is after the microservice that originated the message as identified in the workflow state, wherein the message is processed by one or more other microservices in the transaction processing system to complete execution of the transaction.

2. The method of claim 1, wherein the plurality of microservices comprise a transaction pipeline and each microservice performs a different function for execution of the transaction.

3. The method of claim 1, wherein the one or more errors comprise missing values for data elements, incorrect values for data elements, or invalid values for data elements.

4. The method of claim 3, wherein identifying a trained AI model comprises:
    determining one or more characteristics of the errors in the real-time transaction data; and
    selecting one of the trained AI models based upon the determined characteristics.

5. The method of claim 4, wherein the identified AI model corrects the errors in the real-time transaction data by imputing a predicted replacement value for a data element in the real-time transaction data that has a missing value.

6. The method of claim 4, wherein the identified AI model corrects the errors in the real-time transaction data by replacing an incorrect value for a data element in the real-time transaction data with a predicted correct value.

7. The method of claim 1, wherein the server computing device trains one or more of the plurality of AI models using the real-time transaction data and historical transaction data.

8. The method of claim 7, wherein training one or more of the plurality of AI models using the real-time transaction data and historical transaction data comprises:
    combining, by the server computing device, at least a portion of the real-time transaction data and at least a portion of the historical transaction data into a training dataset;

transforming, by the server computing device, one or more data elements in the training dataset into a format compatible for ingestion by the AI model being trained; and executing, by the server computing device, the AI model being trained using the training dataset to create a re-trained version of the AI model being trained.

9. The method of claim 1, wherein executing the identified AI model using the real-time transaction data as input comprises:

invoking, by the server computing device, an instance of the identified AI model using an application programming interface (API) for the identified AI model;

passing, by the server computing device, the real-time transaction data to the instance of the identified AI model using the API; and receiving, by the server computing device, output from the instance of the identified AI model that comprises the corrected real-time transaction data.

10. A system for automated intelligent correction of erroneous data in a transaction dataset for uninterrupted transaction processing, the system comprising a server computing device having a memory for storing computer-executable instructions and a processor that executes the computer-executable instructions to:

capture real-time transaction data from a transaction message stream connecting a plurality of microservices in a transaction processing system, the real-time transaction data comprising a message that is exchanged between two of the microservices in the transaction processing system during execution of a transaction;

determine one or more errors in the real-time transaction data for the transaction;

identify a trained generative artificial intelligence (AI) model from a plurality of trained generative AI models based upon the determined errors;

execute the identified generative AI model using the real-time transaction data as input to correct the one or more errors in the real-time transaction data for the transaction;

determine a workflow state of the transaction using the real-time transaction data, the workflow state including an identity of the microservice that originated the message;

generate a message for insertion in the transaction message stream, the message comprising the corrected real-time transaction data;

insert the generated message in the transaction message stream after the microservice that originated the message as identified in the workflow state, wherein the message is processed by one or more other microservices in the transaction processing system to complete execution of the transaction.

11. The system of claim 10, wherein the plurality of microservices comprise a transaction pipeline and each microservice performs a different function for execution of the transaction.

12. The system of claim 10, wherein the one or more errors comprise missing values for data elements, incorrect values for data elements, or invalid values for data elements.

13. The system of claim 12, wherein identifying a trained generative AI model comprises:

determining one or more characteristics of the errors in the real-time transaction data; and selecting one of the trained generative AI models based upon the determined characteristics.

14. The system of claim 13, wherein the identified generative AI model corrects the errors in the real-time transaction data by imputing a predicted replacement value for a data element in the real-time transaction data that has a missing value.

15. The system of claim 13, wherein the identified generative AI model corrects the errors in the real-time transaction data by replacing an incorrect value for a data element in the real-time transaction data with a predicted correct value.

16. The system of claim 10, wherein the server computing device trains one or more of the plurality of generative AI models using the real-time transaction data and historical transaction data.

17. The system of claim 16, wherein training one or more of the plurality of generative AI models using the real-time transaction data and historical transaction data comprises:

combining, by the server computing device, at least a portion of the real-time transaction data and at least a portion of the historical transaction data into a training dataset;

transforming, by the server computing device, one or more data elements in the training dataset into a format compatible for ingestion by the generative AI model being trained; and executing, by the server computing device, the generative AI model being trained using the training dataset to create a re-trained version of the generative AI model being trained.

18. The system of claim 10, wherein executing the identified generative AI model using the real-time transaction data as input comprises:

invoking, by the server computing device, an instance of the identified generative AI model using an application programming interface (API) for the identified generative AI model;

passing, by the server computing device, the real-time transaction data to the instance of the identified generative AI model using the API; and receiving, by the server computing device, output from the instance of the identified generative AI model that comprises the corrected real-time transaction data.

* * * * *